(12) United States Patent
Leone et al.

(10) Patent No.: US 12,440,619 B2
(45) Date of Patent: Oct. 14, 2025

(54) MICROPLEGIA DELIVERY SYSTEM

(71) Applicant: Terumo Cardiovascular Systems Corporation, Ann Arbor, MI (US)

(72) Inventors: Carmen Joseph Leone, Chelsea, MI (US); Paul Thomas Kotnik, Commerce Township, MI (US)

(73) Assignee: Terumo Cardiovascular Systems Corporation, Ann Arbor, MI (US)

( * ) Notice: Subject to any disclaimer, the term of this patent is extended or adjusted under 35 U.S.C. 154(b) by 839 days.

(21) Appl. No.: 16/992,795

(22) Filed: Aug. 13, 2020

(65) Prior Publication Data

US 2022/0047802 A1    Feb. 17, 2022

(51) Int. Cl.
| | |
|---|---|
| *A61M 1/36* | (2006.01) |
| *A61M 5/145* | (2006.01) |
| *A61M 60/113* | (2021.01) |
| *A61M 60/50* | (2021.01) |
| *A61M 60/205* | (2021.01) |

(52) U.S. Cl.
CPC ........ *A61M 5/1452* (2013.01); *A61M 1/3623* (2022.05); *A61M 1/3667* (2014.02); *A61M 60/113* (2021.01); *A61M 60/50* (2021.01); *A61M 1/3626* (2013.01);
(Continued)

(58) Field of Classification Search
CPC .............. A61M 1/3623; A61M 1/3626; A61M 1/3632; A61M 1/3664; A61M 1/3666; A61M 1/3667; A61M 1/3672; A61M 2202/047; A61M 2205/3334; A61M 2205/3368; A61M 2205/52; A61M 5/1452; A61M 60/113; A61M 60/205; A61M 60/50
See application file for complete search history.

(56) References Cited

U.S. PATENT DOCUMENTS

| | | |
|---|---|---|
| 4,976,682 A | 12/1990 | Lane et al. |
| 5,158,533 A | 10/1992 | Strauss et al. |
| (Continued) | | |

FOREIGN PATENT DOCUMENTS

| | | |
|---|---|---|
| CN | 107106767 | 8/2017 |
| EP | 0587101 | 3/1997 |
| (Continued) | | |

OTHER PUBLICATIONS

EP Office Action in European Appln. No. 21189085.0, dated Sep. 1, 2023, 10 pages.
(Continued)

*Primary Examiner* — Kai H Weng
(74) *Attorney, Agent, or Firm* — Fish & Richardson P.C.

(57) ABSTRACT

Microplegia systems describe herein use syringe pumps that are controlled in a coordinated fashion to deliver cardioplegia medications during an open-heart surgery at the prescribed dosages and/or rates. The microplegia systems link the delivery rate of the syringe pumps with the delivery rate of the cardioplegia blood flow rate. A perfusionist can enter prescribed drug concentrations, desired ratios between drug and blood, and the expected dose for each phase of the myocardial protection scheme that will take place during the open-heart surgery. Additionally, or alternatively, the syringe pump systems described herein can also be used to deliver other non-cardioplegia types of therapeutic substances.

20 Claims, 4 Drawing Sheets

(52) U.S. Cl.
CPC ..... *A61M 60/205* (2021.01); *A61M 2202/047* (2013.01); *A61M 2205/3368* (2013.01); *A61M 2205/52* (2013.01)

(56) References Cited

U.S. PATENT DOCUMENTS

| | | | |
|---|---|---|---|
| 5,385,540 | A | 1/1995 | Abbott et al. |
| 5,573,502 | A | 11/1996 | LeCocq et al. |
| 5,588,816 | A | 12/1996 | Abbott et al. |
| 5,645,531 | A | 7/1997 | Thompson et al. |
| RE36,386 | E | 11/1999 | Abbott et al. |
| 6,017,493 | A | 1/2000 | Cambron et al. |
| 6,110,139 | A | 8/2000 | Loubser |
| 7,481,787 | B2 | 1/2009 | Gable et al. |
| 8,394,046 | B2 | 3/2013 | Nuernberger et al. |
| 8,608,953 | B2 | 12/2013 | Brotherton et al. |
| 2004/0111079 | A1 | 6/2004 | Hayes et al. |
| 2008/0027368 | A1* | 1/2008 | Kollar .................. A61M 1/3621 604/6.14 |
| 2008/0077072 | A1 | 3/2008 | Keenan et al. |
| 2008/0077073 | A1 | 3/2008 | Keenan et al. |
| 2008/0077074 | A1 | 3/2008 | Keenan et al. |
| 2013/0190717 | A1* | 7/2013 | Dollar ................... A61M 5/172 434/262 |
| 2015/0148739 | A1 | 5/2015 | Radicella |
| 2016/0158440 | A1 | 6/2016 | Radicella |
| 2017/0304523 | A1 | 10/2017 | Turner |
| 2019/0070352 | A1* | 3/2019 | Tsubouchi .......... A61B 5/1473 |
| 2019/0175813 | A1* | 6/2019 | Spearman ........... A61M 1/3621 |

FOREIGN PATENT DOCUMENTS

| | | |
|---|---|---|
| EP | 0583148 | 12/1998 |
| EP | 1110562 | 6/2001 |
| EP | 0643976 | 3/2002 |
| EP | 0828526 | 12/2002 |
| EP | 1250634 | 5/2014 |
| GB | 2532245 | 10/2017 |
| JP | H07322392 | 12/1995 |
| JP | 2001198214 | 7/2001 |
| JP | 2002000723 | 1/2002 |
| JP | 2003180827 | 7/2003 |
| JP | 2005143973 | 6/2005 |
| JP | 2017533789 | 11/2017 |
| WO | WO95023620 | 9/1995 |
| WO | WO95028187 | 10/1995 |
| WO | WO02053209 | 7/2002 |
| WO | WO16075453 | 5/2016 |

OTHER PUBLICATIONS

EP Search Report in European Appln. No. 21189085.0, dated Dec. 22, 2021, 13 pages.

* cited by examiner

MICROPLEGIA DELIVERY SYSTEM

BACKGROUND

1. Technical Field

This document relates to a heart/lung machine that includes a microplegia system.

2. Background Information

In traditional cardioplegia provided during open-heart surgery using a heart/lung machine, large volumes of crystalloid solution (as the carrier solution for the cardioplegia medication) are delivered to the patient, causing the hematocrit concentration in the blood to drop. This often leads to the need for hemoconcentrator use to remove the excess fluid and/or addition of packed red blood cells. Both approaches can cause complications in the patient. A preferred approach is to minimize the about of crystalloid medication given to still the heart.

SUMMARY

This document describes microplegia delivery systems. This document also describes systems that include a heart/lung machine and a microplegia delivery system.

The microplegia process provides small amounts of cardioplegia agents with each cardioplegia dose to a patient undergoing open-heart surgery. This is accomplished by directly delivering the cardioplegia agents into the blood-carrying portion of the cardioplegia circuit, without the additional crystalloid carrier solution of conventional cardioplegia systems that dilutes the blood.

The microplegia systems described herein use one or more syringe pumps that are controlled in a coordinated fashion to deliver the cardioplegia medications at prescribed dosages and rates at the proper/prescribed times. In some embodiments, the microplegia systems described herein link the individual flow rates of the syringe pumps with the actual, real-time measured flow rate of the cardioplegia blood flow. For example, as part of the heart/lung system setup procedure, the perfusionist can enter the prescribed drug concentrations, the desired ratio between the drugs and blood, and/or the expected dose (either dose volume or dose flow rate and duration) for each phase of the myocardial protection scheme that will take place during an open-heart surgery. This allows the perfusionist to use the appropriate amount of cardioplegia drug(s) for each phase, keeping the overall drug amount to a minimum.

The control system of the heart/lung system (or microplegia delivery system) will then operate/modulate the syringe pumps to deliver the appropriate amount of the drug(s) for the prescribed doses and/or the correct proportions of the drugs to blood for each delivery phase. In some embodiments, the control system will automatically calculate new flow rates and dose amounts for each phase of the open-heart surgery procedure, based on the set-up information entered by the perfusionist prior to the start of the procedure.

The microplegia delivery systems described herein also provide the ability for the user to change the drug-to-blood ratios on the fly using an adjustment knob and/or single keystroke. The control system will also adjust the drug delivery rate as the cardioplegia blood flow rates are changed without any additional user intervention. The microplegia systems described herein will also allow simultaneous starting and stopping of the syringe pump(s) (with cardioplegia medication) in conjunction with the starting and stopping of the cardioplegia blood pump, similar to a master/follower type of setup, so as to avoid accidental failure to coordinate starting/stopping of the pumps (the cardioplegia blood pump and the cardioplegia medication pumps).

During operation, the microplegia systems described herein will record the actual amount of blood and drug delivered for each phase of the myocardial protection scheme and make this available (e.g., by display) at the end of the procedure.

In addition, the microplegia systems described herein allow short half-life cardioplegia medications to be delivered essentially at the surgical field as opposed to at the heart/lung machine, thereby increasing the efficacy of such medications.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described herein. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description herein. Other features, objects, and advantages of the invention will be apparent from the description and drawings, and from the claims.

DESCRIPTION OF THE DRAWINGS

Like reference numbers represent corresponding parts throughout.

DETAILED DESCRIPTION

This document describes microplegia delivery systems. This document also describes heart/lung machine systems that include a microplegia delivery system.

Figure 1:
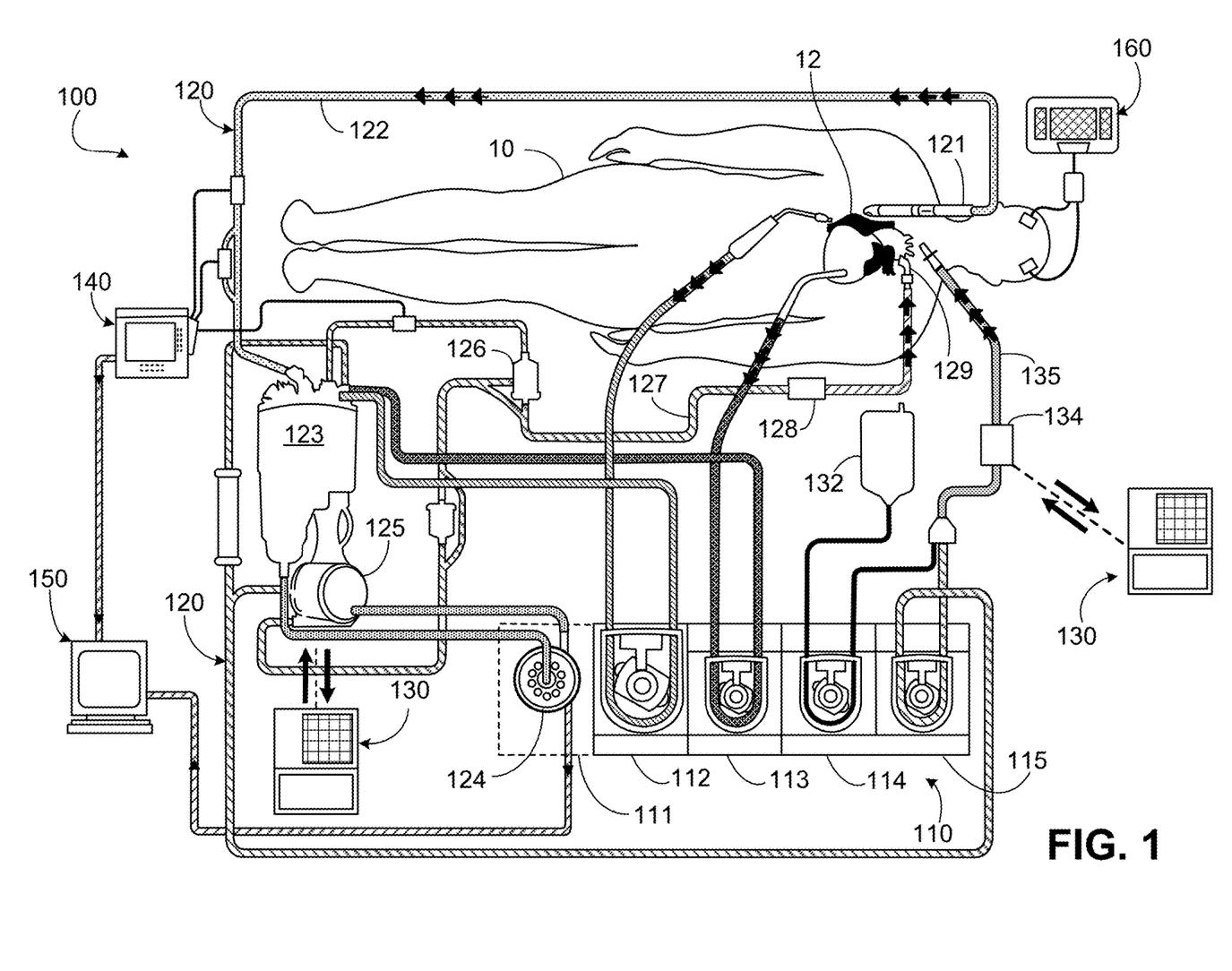
FIG. 1 is a schematic diagram of patient undergoing open-heart surgery while being supported using a heart/lung machine and extracorporeal circuit in accordance with some embodiments provided herein.

As shown in FIG. 1, various types of medical procedures can be performed on a patient 10 while the patient 10 is connected to a life-sustaining heart/lung bypass machine system 100. In this example, the patient 10 is undergoing open-heart surgery during which the heart 12 and lungs of the patient 10 are temporarily intentionally caused to cease functioning. Because the body of the patient 10 continues to have a metabolic need to receive a supply of circulating oxygenated blood during the medical procedure, however, the heart/lung bypass machine system 100 performs such functions. That is, as described further below, the heart/lung bypass machine system 100 is connected to the patient 10 and performs the functions of the heart 12 and lungs of the patient 10 so that the patient 10 stays alive and healthy during open-heart surgery. The heart/lung bypass machine system 100 can be used for many different types of medical procedures. For example, the medical procedures for which the heart/lung bypass machine system 100 can be used include, but are not limited to, coronary artery bypass grafts, heart valve repairs, heart valve replacements, heart transplants, lung transplants, ablation procedures, repair of septal defects, repair of congenital heart defects, repair of aneurysms, pulmonary endarterectomy, pulmonary thrombectomy, and the like.

The heart/lung bypass machine system 100 is typically set up and operated by a specially-trained clinician called a perfusionist. Perfusionists form part of the wider cardiovascular surgical team that includes cardiac surgeons, anesthesiologists, and nurses. During medical procedures using the heart/lung bypass machine system 100, the perfusionist is tasked with many responsibilities, not the least of which is ensuring that the patient 10 is kept alive and healthy by operating the heart/lung bypass machine system 100 in a manner that maintains blood flow to the patient's tissues, and which regulates levels of oxygen and carbon dioxide in the blood of the patient 10. Other responsibilities of the perfusionist include, but are not limited to, administering blood products, administering anesthetic agents or drugs, administering cardioplegia, measuring selected laboratory values (such as blood cell count), monitoring circulation, monitoring blood gases, surveilling anticoagulation, induction of hypothermia, and hemodilution. The responsibilities of the perfusionist are diverse, dynamic, and critically important to achieving successful outcomes of procedures performed on the patient 10 using the heart/lung bypass machine system 100.

In the depicted example, the heart/lung bypass machine system 100 includes components and sub-systems such as a heart/lung machine 110, an extracorporeal circuit 120, one or more temperature control systems 130, a blood monitoring system 140, a perfusion data management system 150, and a regional oximetry system 160. Some types of procedures that use the heart/lung bypass machine system 100 may not require all of the components and sub-systems that are shown. Some types of procedures that use the heart/lung bypass machine system 100 may require additional components and/or sub-systems that are not shown.

The extracorporeal circuit 120 is connected to the patient 10, and to the heart/lung machine 110. Other systems, such as the temperature control system 130, blood monitoring system 140, and perfusion data management system 150 may also be arranged to interface with the extracorporeal circuit 120. The extracorporeal circuit 120 is connected to the patient 10 at the patient's heart 12. Oxygen-depleted blood (venous blood) from the patient 10 is extracted from the patient 10 at the patient's heart 12 using a venous catheter 121. As described further below, the blood is circulated through the extracorporeal circuit 120 to receive oxygen and remove carbon dioxide. The oxygenated blood is then returned through the extracorporeal circuit 120 to the patient's heart 12 via an aortic cannula 129.

The extracorporeal circuit 120 can include, at least, a venous tube 122 that is coupled to the venous catheter 121, a blood reservoir 123, a centrifugal pump 124, an oxygenator 125, an arterial filter 126, one or more air bubble detectors 128, and an arterial tube 127 that is coupled to the aortic cannula 129. The venous catheter 121 and venous tube 122 are in fluid communication with the venous side of the circulatory system of the patient 10. The venous tube 122 is also in fluid communication with an inlet to the reservoir 123. An outlet from the reservoir 123 is connected by tubing to an inlet of the pump 124. The outlet of the pump 124 is connected by tubing to an inlet of the oxygenator 125. The outlet of the oxygenator 125 is connected by tubing to an inlet of the arterial filter 126. An outlet of the arterial filter 126 is connected to the arterial tube 127. One or more pressure transducers can be located along the arterial tube 127 to detect a heart/lung machine (HLM) system line pressure of the blood in the arterial tube 127, which is measured by the heart/lung machine 110 and monitored by the perfusionist. The arterial tube 127 is connected to the arterial cannula 129, which is in physical contact with the heart 12 and in fluid communication with the arterial side of the circulatory system of the patient 10.

Briefly, the extracorporeal circuit 120 operates by removing venous, oxygen-depleted blood from the patient 10 via the venous catheter 121, and depositing the venous blood in the reservoir 123 via the venous tube 122. In some cases, gravity is used to cause the blood to flow or drain from the patient 10 to the reservoir 123. In some cases, vacuum is used to assist the blood to flow from the patient 10 to the reservoir 123. At least some amount of blood is intended to be maintained in the reservoir 123 at all times during the surgical procedure. Otherwise, if the reservoir 123 becomes empty, air could be pumped into the extracorporeal circuit 120, and potentially into the vasculature of the patient 10. Such a result would likely be catastrophic for the patient 10. Accordingly, the perfusionist is tasked with visually monitoring the level of the blood in the reservoir 123. In addition, level detectors can be included in conjunction with the reservoir 123 to issue an alarm in response to detection of low-level conditions within the reservoir 123. Moreover, one or more air bubble detectors 128 can be located at various sites along the extracorporeal circuit 120. Blood from the reservoir 123 is drawn by the pump 124. While the depicted embodiment includes a one-time use centrifugal pump as the pump 124, in some cases a peristaltic pump of the heart/lung machine 110 is used instead. The pressure generated by the pump 124 propels the blood through the oxygenator 125. The perfusionist will adjust the pump 124 to operate as desired, while avoiding operational issues such as negative cavitation that could create micro air in the blood of the extracorporeal circuit 120. In the oxygenator 125, the venous blood is heated/cooled and then enriched with oxygen, and carbon dioxide is removed from the blood. The now oxygen-rich arterial blood exits the oxygenator 125, travels through the arterial filter 126 to remove emboli, and is injected into the patient's heart 12 through the arterial tube 127 via the aortic cannula 129.

The extracorporeal circuit 120 can also include tubing and other components for facilitating functions such as, but not limited to, drainage of blood accumulating in the heart of the patient 10, providing surgical suction for maintaining visibility of the surgical field, delivery of cardioplegia solution to the blood/cardioplegia supply line 135 (or "table line") during the procedure, measuring blood parameters, removing air from the blood, hemoconcentration, drug addition, obtaining blood samples, heating and cooling of the blood, and the like.

During a surgical procedure using the heart/lung bypass machine system 100, various vital signs of the patient 10 are measured and/or monitored. For example, a patient mean arterial pressure ("MAP") may be measured. The MAP of the patient 10 is a parameter that a perfusionist operating the heart/lung bypass machine system 100 will monitor in order to ensure that the heart/lung bypass machine system 100 is functioning as desired during the surgical procedure. In some cases, the MAP reading is displayed on a screen of an anesthesia system, and/or displayed on the operating room screen. If the MAP of the patient 10 is outside of a desired range, the perfusionist may make adjustments to the heart/lung bypass machine system 100 to improve the MAP of the patient 10.

The heart/lung bypass machine system 100 also includes the heart/lung machine 110. The heart/lung machine 110 is a complex system that includes multiple pumps, monitors, controls, user interfaces, alarms, safety devices, and the like, that are all monitored and operated/adjusted by the perfusionist during a surgical procedure. For example, the depicted heart/lung machine 110 includes an arterial pump 111 (which can be a drive system for a disposable centrifugal pump 124 as shown, or a peristaltic pump), a suction pump 112, a vent/drainage pump 113, a cardioplegia solution pump 114, and a cardioplegia delivery pump 115. The heart/lung machine 110 can also include, or be interfaced with, devices such as a tubing occluder, gas blender, and the like. The parameters of the heart/lung machine 110, such as the rotational speed and other parameters of each of the pumps, are set and adjusted by the perfusionist. For example, the speed of the arterial pump 111 is adjusted to maintain a desirable level of blood in the reservoir 123, and to provide a requisite level of blood circulation within the patient 10.

The cardioplegia solution pump 114 conveys cardioplegia solution (including crystalloid solution as a carrier solution for one or more cardioplegia agents) that is sourced from a cardioplegia solution bag 132. The cardioplegia solution exiting from the cardioplegia solution pump 114 is mixed with oxygenated blood that is conveyed by the cardioplegia delivery pump 115. After the cardioplegia solution is mixed with the blood, the mixture in the blood/cardioplegia supply line 135 passes through a heat exchanger 134 that can be used/controlled to heat or cool the mixture of cardioplegia solution and blood to a desired temperature. After the passing through the heat exchanger 134, the mixture of cardioplegia solution and blood in the blood/cardioplegia supply line 135 is injected into the heart 12 in either an antegrade or retrograde manner.

In some cases, the cardioplegia solution(s) can be administered to the patient 10 in accordance with three phases: (i) an induction dose, (ii) maintenance doses, and (iii) a reperfusion or reanimation dose. The induction dose (typically including potassium) is administered to arrest the heart 12. Maintenance doses are thereafter administered periodically (e.g., every 15 minutes) during the surgery to nourish the tissues of the heart 12. The reperfusion or reanimation dose is administered near the end of the surgery to warm and restart the heart (e.g., to flush out potassium).

The heart/lung bypass machine system 100 also includes one or more temperature control systems 130. In a first aspect, the temperature control system(s) 130 is/are used to heat and cool the patient's blood in the oxygenator 125 via a heat exchanger. Additionally, the temperature control systems 130 is used with the heat exchanger 134 to heat or cool the cardioplegia solution (and blood) being delivered to the patient 10 via the blood/cardioplegia supply line 135. In general, the temperature control system(s) 130 is/are used in cooling modes during the procedure (to reduce metabolic demands), and subsequently used to warm the blood and/or cardioplegia solution when the surgical procedure is nearing its end. The perfusionist is tasked with monitoring and adjusting the temperature control system(s) 130 as needed during the surgical procedure.

The heart/lung bypass machine system 100, as depicted, also includes the blood monitoring system 140. The blood monitoring system 140 is used to monitor the extracorporeal blood of the patient 10 during the surgical procedure. Parameters being monitored can include, but are not limited to, pH, $pCO_2$, $pO_2$, K+, temperature, $SO_2$, hematocrit, hemoglobin, base excess, bicarbonate, oxygen consumption and oxygen delivery. The perfusionist is tasked with monitoring the blood monitoring system 140 during the surgical procedure. In some cases, the perfusionist will need to adjust other components or subsystems of the heart/lung bypass machine system 100 in response to readings from the blood monitoring system 140.

The heart/lung bypass machine system 100, as depicted, also includes the perfusion data management system 150 and the regional oximetry system 160. These systems can also be used by the perfusionist to monitor the status of the patient 10 and/or the status of the heart/lung bypass machine system 100 during surgical procedures.

From the above description, it can be observed and understood that the perfusionist is tasked with a vast amount of very important responsibilities during a surgical procedure using the heart/lung bypass machine system 100.

To centralize and automate some of the tasks of the perfusionist pertaining to cardioplegia delivery, this disclosure describes a system of one or more syringe pumps for delivering cardioplegia solutions that can be included as part of the heart/lung bypass machine system 100, or as a stand-alone system.

Figure 2:
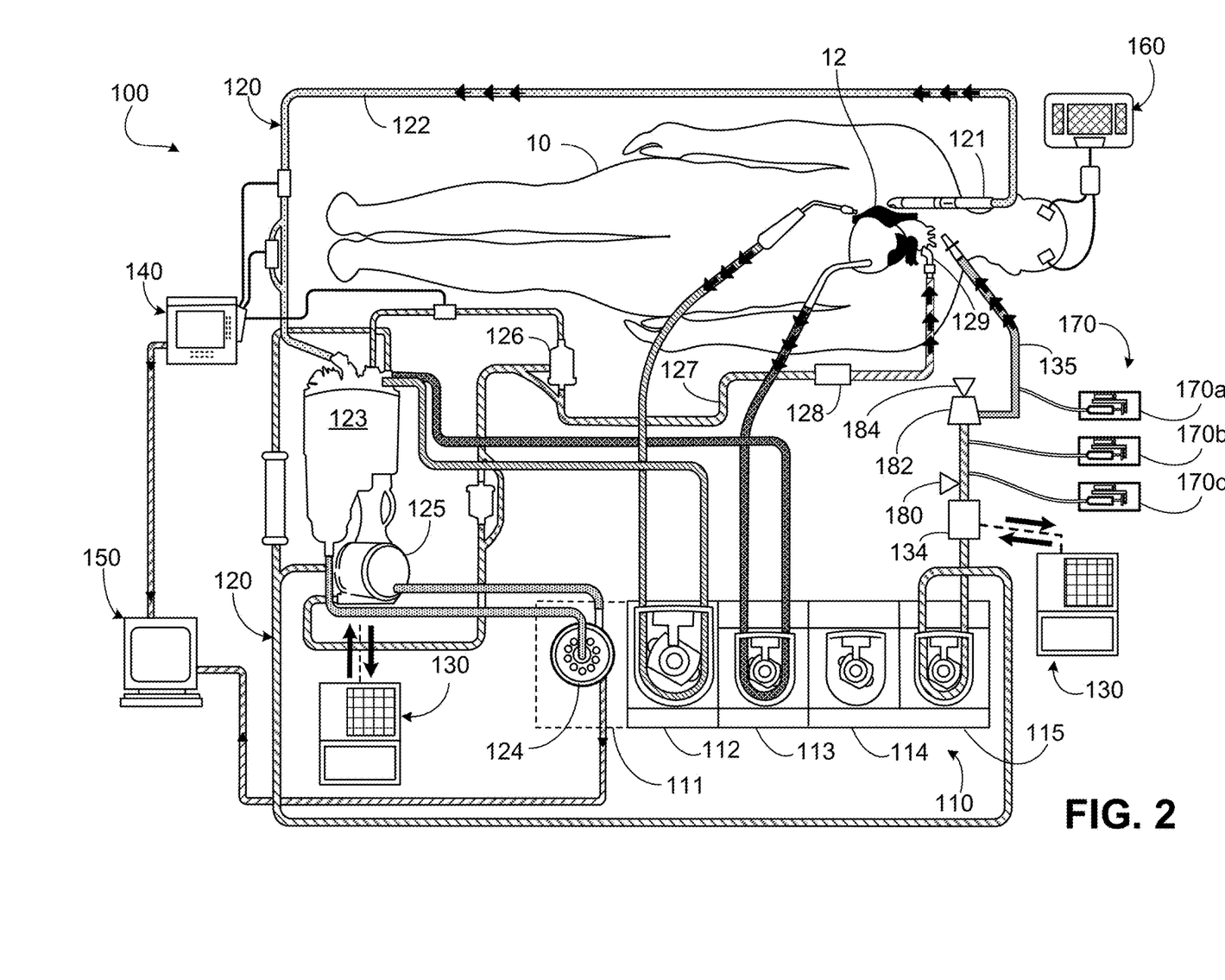
FIG. 2 is a schematic diagram of the patient undergoing open-heart surgery while supported using the systems of FIG. 1, except an example microplegia system is being used rather than the conventional cardioplegia system shown in FIG. 1.

As shown in FIG. 2, the heart/lung bypass machine system 100 can include a system of one or more syringe pumps 170 to deliver one or more different types of cardioplegia agents into the oxygenated blood returning to the heart 12 of the patient 10 via the blood/cardioplegia supply line 135. The system of syringe pumps 170 can be pole-mounted, arranged on one or more racks, positioned on one or more carts, and combinations thereof.

The depicted system of syringe pumps 170 includes three syringe pumps 170a, 170b, 170c (or 170a-c collectively). However, in general any number of syringe pumps 170 can be used (e.g., one, two, three, four, five or more)—corresponding to the number of cardioplegia agents to be used during the surgical procedure.

In some embodiments, each syringe pump 170a, 170b, and 170c of the system of syringe pumps 170 can be individually in electrical signal communication with the programmed control system(s) of the heart/lung machine 110. Accordingly, in some such embodiments the operations of each syringe pump 170a, 170b, and 170c can be individually controlled by the control system of the heart/lung machine 110, and thereby controlled in response to preprogrammed algorithms and/or user set-up parameters and other user inputs. For example, each syringe pump 170a, 170b, and 170c can be individually controlled (by the control system of the heart/lung machine 110) to start operating, to inject its cardioplegia agent at a particular flow rate, to inject a particular amount of the cardioplegia agent, to operate for a particular amount of time, and/or to stop operating. Moreover, each syringe pump 170a, 170b, and 170c can be individually controlled in coordination with the other components the heart/lung machine 110 (e.g., in coordination with the cardioplegia delivery pump 115) and taking into account which phase the surgical procedure in is (e.g., beginning, middle, or end). Additionally, or alternatively, in some embodiments the system of syringe pumps 170 is configured to be controlled/operated independently of the operations of the heart/lung machine 110.

In some embodiments, a dedicated user interface for the system of syringe pumps 170 is included by which a perfusionist can enter inputs to control the system of syringe pumps 170. Alternatively, or additionally, in some embodiments the user interface(s) of the heart/lung machine 110 can be used to receive user inputs to control the system of syringe pumps 170.

The depicted system of syringe pumps 170 can be utilized instead of the cardioplegia solution pump 114 that conveys cardioplegia solution (including crystalloid) from the cardioplegia solution bag 132 as described above in reference to FIG. 1. The use of the system of syringe pumps 170 can allow the cardioplegia agents to be administered to the patient 10 without requiring the cardioplegia agents to be mixed/diluted with crystalloid. Accordingly, by using the system of syringe pumps 170, the blood of the patient 10 will advantageously not become as diluted as if the conventional cardioplegia system of FIG. 1 is used.

The blood/cardioplegia supply line 135 of the extracorporeal circuit 120 shown in FIG. 2 further includes a temperature sensor 180 (located after the heat exchanger 134), an air bubble trap 182, and a pressure transducer 184. The temperature sensor 180 allows the perfusionist (and/or the control system of the heart/lung machine 110) to monitor and/or control the temperature of the oxygenated blood prior to the infusion of the cardioplegia agent(s) from the syringe pumps 170a-c. The bubble trap 182 removes air bubbles that may be entrained in the blood/cardioplegia mixture before reaching the heart 12. The pressure transducer 184 can be used by the perfusionist (and/or the control system of the heart/lung machine 110) to monitor the pressure of the blood/cardioplegia mixture in the blood/cardioplegia supply line 135. The pressure transducer 184 can facilitate the ability to control the flow rate of the mixture of cardioplegia solution and blood to maintain a desired line pressure in the blood/cardioplegia supply line 135 for desired cardioplegia dose delivery.

The system of multiple syringe pumps 170 advantageously allows the individual cardioplegia agents to be delivered (injected) into the blood/cardioplegia supply line 135 at different points and with independent drug delivery rate control along the blood/cardioplegia supply line 135 (rather than at a single point as with the conventional cardioplegia delivery system of FIG. 1). For example, in the depicted embodiment the syringe pumps 170b and 170c inject cardioplegia agents into the blood/cardioplegia supply line 135 after the heat exchanger 134 but prior to the bubble trap 182, and the syringe pump 170a injects its cardioplegia agent after the bubble trap 182 (closer to the patient 10 than the syringe pumps 170b and 170c). This ability to inject cardioplegia agents at different points along the blood/cardioplegia supply line 135, and to inject a cardioplegia agent close to the patient is advantageous for the reasons described herein.

Figure 3:
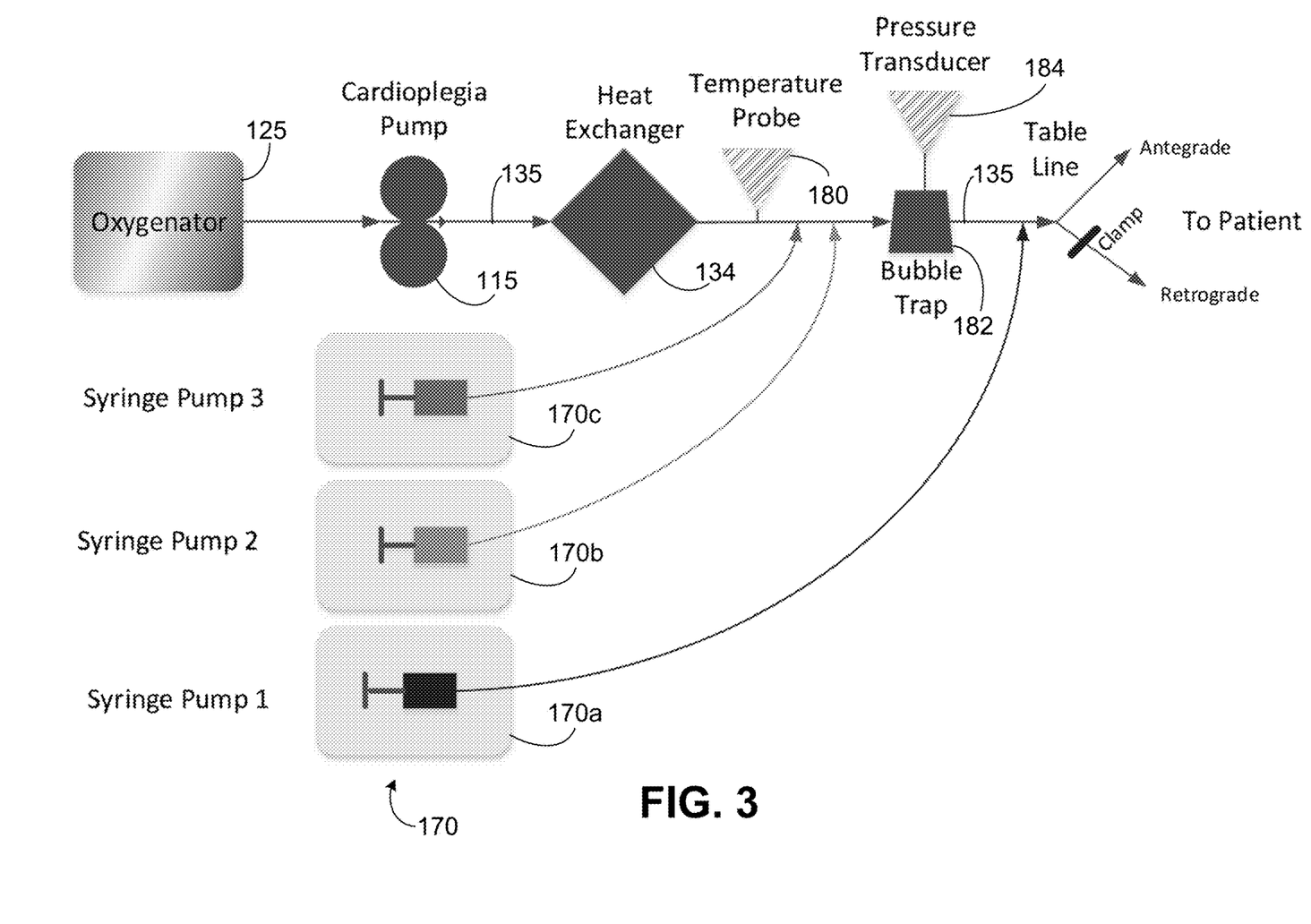
FIG. 3 is a schematic diagram of the example microplegia system of FIG. 2 and relevant portions of the heart/lung machine and extracorporeal circuit of FIG. 2.

FIG. 3 depicts a schematic diagram of a portion of the extracorporeal circuit 120 of FIG. 2, including the oxygenator 125, the cardioplegia pump 115, the blood/cardioplegia supply line 135, the heat exchanger 134, the temperature probe 180, the bubble trap 182, the pressure transducer 184, and including the three syringe pumps 170a, 170b, and 170c.

Each syringe pump 170a-c of the system 170 is an infusion device used to deliver cardioplegia agents contained within installed syringes in a controllable manner and at a precise flow rate. Each syringe pump 170a-c can have a receiver portion configured to removably receive a syringe containing a cardioplegia agent, a drive mechanism controllably operable for gradually driving the plunger of the syringe to eject the cardioplegia agent at a prescribed flow rate, and, optionally, a user interface for receiving inputs from the perfusionist.

A syringe with a cardioplegia agent can be installed into each of the syringe pumps 170a-c prior to beginning the surgical procedure. During installation of the syringes in the syringe pumps 170a-c, the tips of the syringes are connected to tubing exiting the syringe pump 170a-c via a fluid-secure means such as a luer locking or compression fitting mechanism. The tubing is in fluid communication with the blood/cardioplegia supply line 135, such as after (downstream of) the temperature probe 180.

The drive mechanism of each syringe pump 170a-c can control the on/off and flow rate from its syringe based on control signals received from the heart/lung machine 110 and/or based on input(s) from the perfusionist. For example, in some embodiments the perfusionist can input desired flow rates and/or agent-to-blood ratios for each of the cardioplegia agents. In some embodiments, the perfusionist can input such prescribed flow rates and/or agent-to-blood ratios for each syringe pump 170a-c for one or more time periods or phases occurring during the surgical procedure (e.g., the induction dose phase, the maintenance dose phase, and the reperfusion or reanimation dose phase).

In some embodiments, the perfusionist can program or control the flow rate of each of the syringe pumps 170a-c of the system individually or collectively. In some embodiments, the syringe pump 170a-c flow rates can be linked to automatically modulate based on the actual flow rate of the cardioplegia delivery pump 115. For example, in some embodiments the perfusionist can set each of the syringe pumps 170a-c to operate at a flow rate that is a percentage corresponding to the actual flow rate of the cardioplegia delivery pump 115. Alternatively, the perfusionist can set up the syringe pumps 170a-c to operate at a flow rate that is a particular ratio to the actual flow rate of the cardioplegia blood delivery pump 115. Different percentages or ratios for each of the syringe pumps 170a-c can be pre-programmed by the perfusionist for each phase of the surgery (e.g., the induction dose phase, the maintenance dose phase, and the reperfusion or reanimation dose phase). In such a case, the control system of the heart/lung machine 110, and/or the syringe pump 170a-c systems, can make automatic adjustments to maintain the pre-set ratios established by the perfusionist's input.

Each syringe pump 170a-c of the system is in fluid communication with the blood/cardioplegia supply line 135 at a separate point, spaced longitudinally apart from each other. For example, FIG. 3 depicts syringe pumps 170b and 170c in fluid communication with the blood/cardioplegia supply line 135 between the temperature sensor 180 and the bubble trap 182, and a third syringe pump 170a in fluid communication with the blood/cardioplegia supply line 135 between the pressure transducer 184 and the patient 10. In this manner, cardioplegia agents that may have a short medically active duration, (e.g., Adenocaine, etc.) can be advantageously infused into the blood/cardioplegia supply line 135 close to the patient 10 (e.g., using the syringe pump 170a). This increases the efficacy of such cardioplegia agents to the patient 10.

Figure 4:
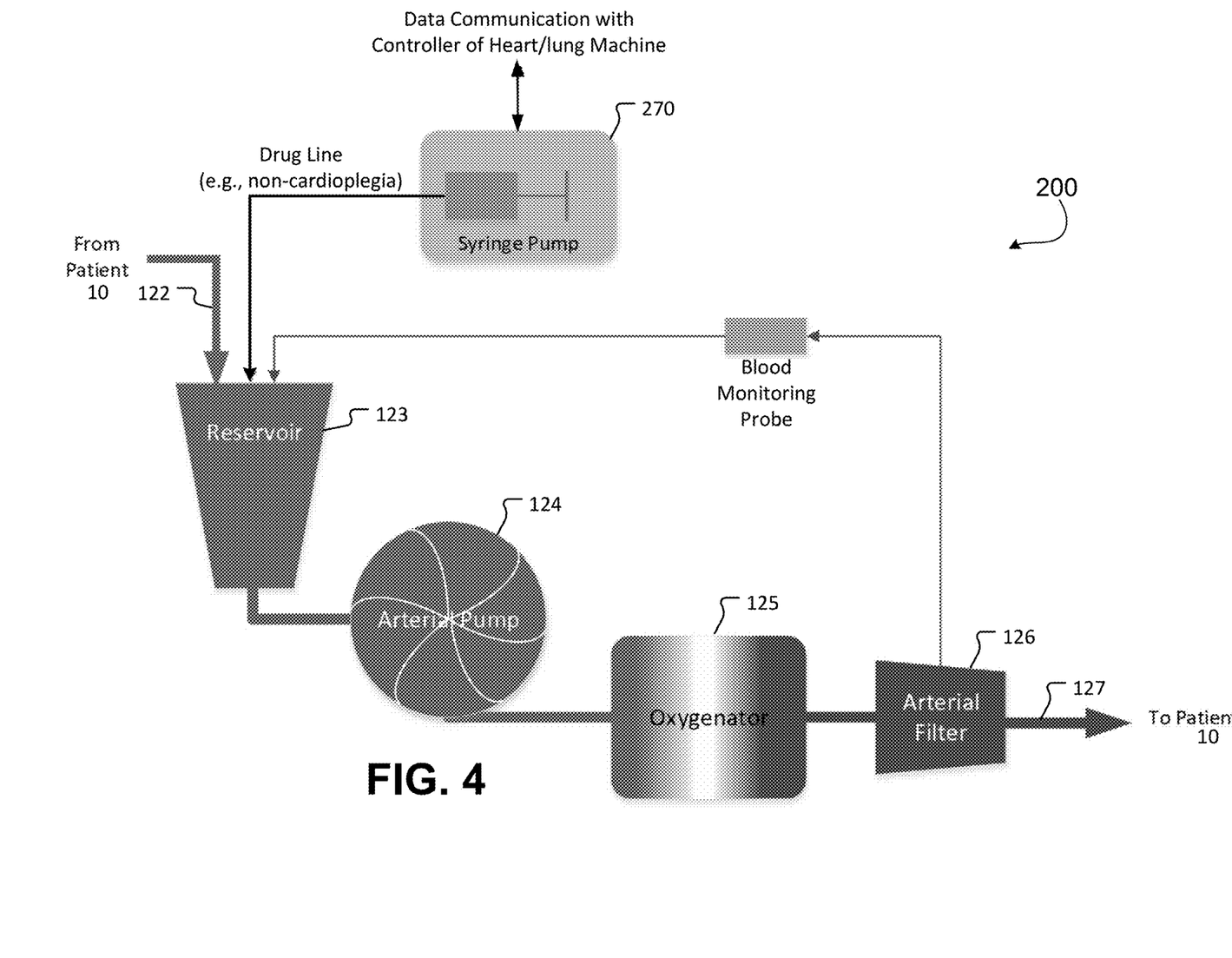
FIG. 4 is a schematic diagram of an example drug delivery system in conjunction with relevant portions of the heart/lung machine and extracorporeal circuit of FIG. 1.

FIG. 4 schematically depicts an alternative drug delivery system 200 synchronized with the HLM. The drug delivery system 200 can be used in conjunction with the cardioplegia system arrangement (e.g., the arrangements of FIGS. 1, 2, and/or 3) or by itself without another cardioplegia system arrangement.

The drug delivery system 200 includes a syringe pump 270. While a single syringe pump 270 is depicted, it should be understood that two, three, or more than three syringe pumps 270 can be included in the system 200 in some embodiments. The syringe pump 270 is configured to deliver one or more drug solutions as described above in reference to the syringe pumps 170a-c. The syringe pump 270 can include any of the operational features that are described in reference to the syringe pumps 170a-c. In addition, the syringe pump 270 is in two-way data communication with the control system of the heart/lung machine 110 (FIG. 1). Accordingly, the syringe pump 270 can be controlled by the control system of the heart/lung machine 110 to operate in any of the manners described above in reference to the syringe pumps 170a-c.

The syringe pump 270 delivers one or more drug solutions to the venous blood reservoir 123. In the venous blood reservoir 123, the one or more drug solutions delivered from the syringe pump 270 is/are mixed with the venous blood of the patient 10. The mixture then exits the venous blood reservoir 123, passes through the arterial pump 124, the oxygenator 125, and the arterial filter 126 before being returned to the patient 10.

A perfusionist user of the drug system 200 will be able to enter into a user interface a target set point of the concentration (or dosage) of the one or more drug solutions to be delivered from the syringe pump 270. In some embodiments, the control system of the heart/lung machine 110 (or the syringe pump 270) can determine a flow rate for the syringe pump 270 to operate at to attain the targeted concentration of the one or more drug solutions. Then, during operation, the syringe pump 270 can be controlled to operate accordingly. Target set points can also be adjusted during operation of the drug delivery system 200. The entry of the target set points can be stored in the memory of the control system of the heart/lung machine 110 and/or the control system of the syringe pump 270.

For some medications to be delivered by the syringe pump 270, the delivery rate can be linked to the arterial blood flow rate either directly or inversely. For other medications, the delivery rate can be controlled independent of the arterial blood flow rate. In either case, the syringe pump 270 can be controlled to stop drug delivery when arterial flow rate is stopped (e.g., in response to an alarm situation such as an alarm from a detection of air in the arterial line 127). In some embodiments, the syringe pumps 170a-c can be stopped directly in response to an alarm of the heart/lung machine 110 (rather than in response to a stoppage of the arterial pump). This is a safety feature that makes the control communications link to heart/lung machine 110 very useful. In one example, when weaning a patient from extracorporeal membrane oxygenation (ECMO), heparin delivered by the syringe pump 270 can be increased to reduce risk of blood clotting, and reduced/discontinued after the patient is off ECMO.

Analogous to the cardioplegia system using the syringe pumps 170a-c as described above, when the syringe pump 270 delivers medication (e.g., non-cardioplegia therapeutic agents) to the blood, the dose amount and timing parameters (e.g., start time and stop time) are stored in the memory of the control system of the heart/lung machine 110 and/or the control system of the syringe pump 270. The concentration can also be stored. These data can be later retrieved/read and used as desired.

The drug delivery system 200 can be used to deliver a bolus of one or more medications from the syringe pump 270. Data describing the delivery of such bolus amounts are stored in the memory of the control system of the heart/lung machine 110 and/or the control system of the syringe pump 270.

In some embodiments, the user will be able to set a low volume alert level for each drug/syringe in the syringe pump 270. The control system of the heart/lung machine 110 and/or the control system of the syringe pump 270 can keep track of the amount of medication pumped from each syringe. An alert/alarm can be generated when the remaining volume in the syringe is at or below the low volume alert level. In some embodiments, expired time can also be used as a basis for generating an alert/alarm. Accordingly, the amount of time remaining prior to running out of the medication in the syringe can be provided and/or used as a basis for generating an alert/alarm.

In some embodiments, the delivery of the medication from the syringe pump 270 can be at least somewhat based on the mean arterial pressure (MAP) during the procedure. For example, in some embodiments the delivery of a vasodilator from the syringe pump 270 can be started when the MAP is above a user-established set point, and stopped when the MAP falls below another user-established set point. In another example, in some embodiments the delivery of a vasopressor can be started when the MAP is below a user-established set point, and stopped when the MAP is above another user-established set point. In still another example, in some embodiments the delivery of the medication from the syringe pump 270 can be titrated based on continuous monitoring of MAP, such as a rate of change of MAP to a desired set point of pressure.

Additional Optional Features

The system can also track and display the time since the last cardioplegia dose. In some embodiments, this timer is automatically reset to zero when the next dose is started.

During operation, the system can record/track the actual amount of blood and cardioplegia agent delivered for each phase of the myocardial protection scheme and make this available at the end of the procedure. For example, volumetric data for each cardioplegia agent administered, by each phase, can be displayed at the end of the procedure, and/or during the procedure.

In some embodiments, the perfusionist can preprogram the myocardial protection scheme into the system (including, for example, prescribed cardioplegia drug-to-blood ratios for each cardioplegia drug and delivery/surgery phase). Then, the system can automatically (or semi-automatically) control the flow rate delivery of the cardioplegia agents in accordance with the program. Moreover, such programs can be saved and reused.

In some embodiments, the system can selectively control/maintain cardioplegia line pressure(s) using pressure sensor feedback as directed by the user.

The system can facilitate automatic simultaneous starting/stopping of syringe pump(s) with the starting/stopping of the cardioplegia blood pump.

In some embodiments, the system can automatically calculate cardioplegia drug flow rates for each delivery phase.

The system can allow the perfusionist a convenient way to change the cardioplegia drug-to-blood ratio on the fly during a surgery.

In some embodiments, a local control module would be responsible for configuring and controlling each syringe pump using a communications link for each syringe pump. The syringe pump-based controls would be disabled, only the local display of the local control module would be active. In some such embodiments, the syringe pumps and the local control module are a stand-alone system (not needing to be interfaced with the heart/lung machine).

In some embodiments, the syringe pumps cannot be operated independently of the heart/lung machine. For example, in some embodiments the clinician cannot enter configuration parameters or commands directly on the syringe pumps. Instead, all commands must come from the heart/lung machine. The only way the syringe pumps would be operational is when they are connected to the heart/lung machine via the local controller. Furthermore, in some embodiments the syringe pumps mechanisms can be embedded in a housing to prevent the appearance of being stand-alone syringe pumps that could operate independently of the heart/lung machine.

In some embodiments, all of the syringe pump mechanisms are mounted in a common housing. Each syringe pump can have a display, a stop button and the required user interface to be able to load and unload a syringe.

In some embodiments, a local control module of the syringe pump system can display a fluid temperature when a temperature probe is linked to the local control module.

In some embodiments, setup of the syringe pump system can be accomplished using multiple different approaches. A first method can be to access the cardioplegia setup screen from the heart/lung machine central user interface monitor (e.g., with an on-screen keyboard). The user will be able to create multiple setups, allowing a specific setup for each procedure and/or surgeon. These can be saved and reloaded as needed. This would then be downloaded to the local cardioplegia controller during setup. In some embodiments, a majority of the setup information will be also be available via the display of the local controller. For example, the user could be able to edit everything but the drug name. In other cases, setup information pertaining to a syringe pump system can be electronically transferred from one heart/lung machine to another heart/lung machine.

In some embodiments, the user will be able to set a low volume alert level for each drug/syringe. The cardioplegia controller or heart/lung machine control system will keep track of the amount of cardioplegia agent pumped from each syringe. An alert/alarm will be generated when the remaining volume in the syringe is at or below the low volume alert level.

In some embodiments, the control system of the heart/lung machine 110 and/or the control system of the drug delivery system can include (or operate) a timer that will be used to issue a reminder to collect a blood sample for an activated clotting time (ACT) lab test. In some embodiments, the control system of the heart/lung machine 110 and/or the control system of the cardioplegia delivery system can allow for entry, via a user interface, ACT lab test results. In some such embodiments, the control system of the heart/lung machine 110 and/or the control system of the drug delivery system can suggest a dose adjustment based on a user-established ACT target value and one or more patient parameters (patient weight, body surface area, or calculated circulating volume, for example). User-established ACT target values can be adjusted during a procedure. All such set-points, test results, and the like can be stored in the memory of the control system of the heart/lung machine 110 and/or the control system of the drug delivery system.

In some embodiments, at the end of a patient treatment procedure using the systems described herein, the control system of the heart/lung machine 110 and/or the control system of the drug delivery system can provide the ability to view all types of drugs and delivered doses/concentrations that occurred during the procedure. In some embodiments, the control system of the heart/lung machine 110 and/or the control system of the drug delivery system is configured to communicate such information to a third party (e.g., a central database, data management system, etc.) during and/or at the end of the procedure.

In some embodiments, each syringe pump includes a local user interface. In some cases, each local user interface would be identified with a specific syringe pump by having a colored light on the syringe pump that matches the background color of the local user interface. For example, in some embodiments it would use the same color scheme used by other pumps to identify the link between local control and syringe pump. In some embodiments, the local user interface(s) would display one or more of the following types of information: drug name, drug flow rate, volume(s) delivered, time duration of deliveries, mean arterial pressure, soft keys for control functions such as start/stop and bolus delivery initiation, delivery ration between arterial flow and drug flow, adjustment inputs (e.g., up/down arrows or a knob) for altering delivery ratio(s) and other set points, notifications (e.g., low drug remaining, no drug remaining, etc.).

In some embodiments, the systems described herein can include one or more timers that can display, for example, the time expired since the last dose. In some such embodiments, notifications can be provided from the systems that are based on values of the timer(s), such as but not limited to, the time expired since the last dose of one or more cardioplegia agents.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A heart/lung bypass machine system comprising:
a heart/lung machine comprising:
an arterial blood pump; and
a cardioplegia blood pump;
a first cardioplegia agent syringe pump configured to inject a first cardioplegia agent at a first location along a blood/cardioplegia supply line;
a second cardioplegia agent syringe pump configured to inject a second cardioplegia agent at a second location along the blood/cardioplegia supply line, wherein the first and second locations are longitudinally spaced apart from each other; and
a controller comprising a hardware processor and computer memory, the controller in electrical signal communication with the cardioplegia blood pump and the first and second cardioplegia agent syringe pumps,
wherein the controller is configured to modulate operational speeds of the first and second cardioplegia agent syringe pumps based on an actual speed of the cardioplegia blood pump and based on a current surgery phase of at least three different phases of surgery,
wherein the at least three different phases of surgery comprise: (i) an induction dose phase, (ii) a maintenance dose phase, and (iii) a reperfusion or reanimation dose phase,
wherein the controller is configured to receive user inputs that correlate the operational speeds of the first and second cardioplegia agent syringe pumps to the actual speed of the cardioplegia blood pump,
wherein the user inputs are percentages of the actual speed of the cardioplegia blood pump,
wherein the controller is configured to issue a time-based reminder to collect a blood sample for an activated clotting time ("ACT") lab test and to allow for entry of results of the ACT lab test, and
wherein the controller is configured to suggest a dose adjustment based on: (i) the results of the ACT lab test, (ii) a user-established ACT target value, and (iii) one or more patient parameters.

2. The system of claim 1, wherein the controller is configured to receive:
a first user input that correlates the operational speed of the first cardioplegia agent syringe pump to the actual speed of the cardioplegia blood pump; and
a second user input that correlates the operational speed of the second cardioplegia agent syringe pump to the actual speed of the cardioplegia blood pump,
wherein the first user input is a first percentage, and the second user input is a second percentage.

3. The system of claim 2, wherein the controller is configured to modulate the operational speeds of the first and second cardioplegia agent syringe pumps based on the first and second user inputs, respectively.

4. The system of claim 2, wherein the first and second user inputs are different from each other.

5. The system of claim 1, wherein the controller is configured to stop the first and second cardioplegia agent syringe pumps in response to a stoppage of the cardioplegia blood pump.

6. The system of claim 1, wherein the controller is configured to track:
a delivered amount of a first cardioplegia agent delivered from the first cardioplegia agent syringe pump; and
a delivered amount of a second cardioplegia agent delivered from the second cardioplegia agent syringe pump.

7. The system of claim 6, further comprising a user interface display, and
wherein the controller is configured to display the tracked delivered amounts of the first and second cardioplegia agents, and wherein the controller is configured to issue an alert based on the tracked delivered amount of the first cardioplegia agent or the second cardioplegia agent being below a low volume alert level.

8. The system of claim 1, further comprising a third cardioplegia agent syringe pump, wherein the controller is configured to modulate an operational speed of the third cardioplegia agent syringe pump based on the actual speed of the cardioplegia blood pump.

9. The system of claim 1, wherein the at least three different phases of surgery are at least three different phases of an open-heart surgical procedure.

10. The system of claim 1, further comprising a third cardioplegia agent syringe pump configured to deliver a third cardioplegia agent, and wherein the controller is configured to modulate an operational speed of the third cardioplegia agent syringe pump based on the actual speed of the arterial blood pump.

11. The system of claim 10, wherein the controller is configured to receive:
a first user input that correlates the operational speed of the first cardioplegia agent syringe pump to the actual speed of the arterial blood pump;
a second user input that correlates the operational speed of the second cardioplegia agent syringe pump to the actual speed of the arterial blood pump; and
a third user input that correlates the operational speed of the third cardioplegia agent syringe pump to the actual speed of the arterial blood pump,
wherein the controller is configured to modulate the operational speeds of the first, second, and third cardioplegia agent syringe pumps based on the first, second, and third user inputs, respectively,
wherein the controller is configured to stop the first, second, and third cardioplegia agent syringe pumps in response to a stoppage of the arterial blood pump, and
wherein the first user input is a first percentage of the actual speed of the arterial blood
pump, the second user input is a second percentage of the actual speed of the arterial blood pump, and the third user input is a third percentage of the actual speed of the arterial blood pump.

12. The system of claim 1, wherein the one or more patient parameters include at least one of patient weight, body surface area, and calculated circulating volume.

13. The system of claim 1, wherein the controller is configured issue notifications based on a time expired since a last dose of cardioplegia agents injected from the first and second cardioplegia agent syringe pumps.

14. A method of operating a heart/lung machine system, the method comprising:
receiving, by a controller of the heart/lung machine system, user inputs indicative of prescribed correlations between a speed of a cardioplegia blood pump and (i) a speed of a first cardioplegia agent syringe pump and (ii) a speed of a second cardioplegia agent syringe pump;

modulating, by the controller of the heart/lung machine system, the speed of the first cardioplegia agent syringe pump based on: (i) an actual speed of the cardioplegia blood pump, (ii) the user input indicative of the prescribed correlation between the speed of the cardioplegia blood pump and the speed of the first cardioplegia agent syringe, and (iii) a current surgery phase of at least three different phases of surgery;

issuing, by the controller, a time-based reminder to collect a blood sample for an activated clotting time ("ACT") lab test;

receiving, by the controller, a user entry of results of the ACT lab test;

suggesting, by the controller, a dose adjustment based on: (i) the results of the ACT lab test, (ii) a user-established ACT target value, and (iii) one or more patient parameters; and modulating, by the controller of the heart/lung machine system, the speed of the second cardioplegia agent syringe pump based on: (i) the actual speed of the cardioplegia blood pump, (ii) the user input indicative of the prescribed correlation between the speed of the cardioplegia blood pump and the speed of the second cardioplegia agent syringe pump, and (iii) the current surgery phase of at least three different phases of surgery, wherein the user inputs are percentages of the actual speed of the cardioplegia blood pump, and wherein the at least three different phases of surgery comprise: (i) an induction dose phase, (ii) a maintenance dose phase, and (iii) a reperfusion or reanimation dose phase.

15. The method of claim 14, wherein the prescribed correlation between the speed of the cardioplegia blood pump and the speed of the first cardioplegia agent syringe pump is different from the prescribed correlation between the speed of the cardioplegia blood pump and the speed of the second cardioplegia agent syringe pump.

16. The method of claim 14, further comprising stopping, by the controller of the heart/lung machine system, the first and second cardioplegia agent syringe pumps in response to a stoppage of the cardioplegia blood pump.

17. The method of claim 14, further comprising receiving, by the controller of the heart/lung machine system, additional user inputs related to the at least three different phases of surgery.

18. The method of claim 14, wherein the user inputs indicative of the prescribed correlations between the speed of the cardioplegia blood pump and the speeds of the first and second cardioplegia agent syringe pumps are ratios of flow rates.

19. The method of claim 14, wherein the one or more patient parameters include at least one of patient weight, body surface area, and calculated circulating volume.

20. The method of claim 14, further comprising issuing, by the controller, notifications based on a time expired since a last dose of cardioplegia agents injected from the first and second cardioplegia agent syringe pumps.

* * * * *